United States Patent [19]
deKam

[11] Patent Number: 4,822,979
[45] Date of Patent: Apr. 18, 1989

[54] TEMPERATURE CONTROLLED SOLDERING IRON WITH A UNITARY ELECTRICALLY HEATED SOLDERING TIP AND THERMOCOUPLE

[76] Inventor: Cornelius T. deKam, 24565 Tamarack Cir., Southfield, Mich. 48075

[21] Appl. No.: 204

[22] Filed: Jan. 2, 1987

[51] Int. Cl.[4] .......................... H05B 1/02; B23K 3/02
[52] U.S. Cl. ..................................... 219/241; 219/229; 219/233; 219/238; 219/240; 219/497; 228/51
[58] Field of Search ........ 219/227, 229, 230, 233–241, 219/501, 497–499; 228/51–55

[56] References Cited
U.S. PATENT DOCUMENTS

| | | | |
|---|---|---|---|
| 2,747,074 | 5/1956 | Finch | 219/241 X |
| 2,897,335 | 7/1959 | Finch | 219/241 X |
| 3,334,352 | 8/1967 | Abbondante et al. | 219/233 X |
| 3,558,854 | 1/1971 | Siegal et al. | 219/233 |
| 3,654,427 | 4/1972 | Schoenwald | 219/241 |
| 3,691,342 | 9/1972 | Giles et al. | 219/233 |
| 3,699,306 | 10/1972 | Finch | 219/241 |
| 3,752,017 | 8/1973 | Lloyd et al. | 219/233 X |
| 4,546,235 | 10/1985 | Kolter | 219/241 |

FOREIGN PATENT DOCUMENTS

| | | | |
|---|---|---|---|
| 143143 | 8/1980 | German Democratic Rep. | 219/241 |
| 260032 | 12/1969 | U.S.S.R. | 219/241 |
| 1252095 | 8/1986 | U.S.S.R. | 219/241 |

Primary Examiner—Anthony Bartis
Attorney, Agent, or Firm—Alex Rhodes

[57] ABSTRACT

A temperature controlled soldering iron wherein the same pair of dissimilar conductors, joined together, unitarily provides a soldering tip, a heating element for heating the soldering tip and a thermocouple for sensing the temperature of the soldering tip. When current is supplied to the conductors, a temperature effect is produced which is in addition to the normal heating of the conductors and results in a corresponding voltage which varies directly with the temperature of the conductors. The voltage is applied to a control circuit where it is amplified, compared against a reference voltage, corresponding to a pre-selected soldering temperature, and the voltage derived from said comparison is applied to regulating the current used for heating the dissimilar conductors. The dissimilar conductors are formed from wires of dissimilar metals and mounted in a generally cylindrical handle by a means which minimizes handle temperatures. One embodiment is particularly adapted for surface mounting electronic components on printed circuit boards.

15 Claims, 3 Drawing Sheets

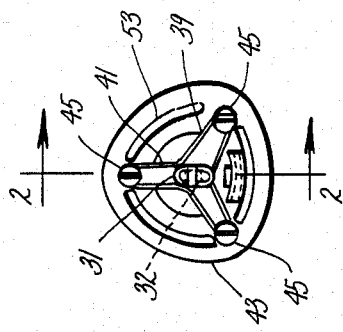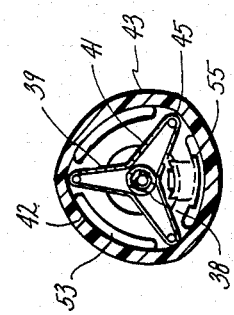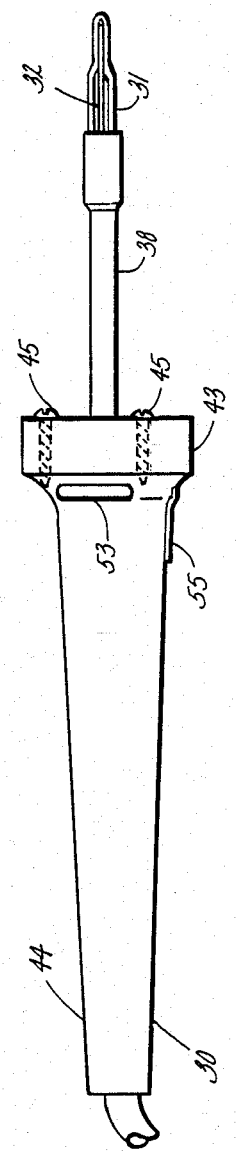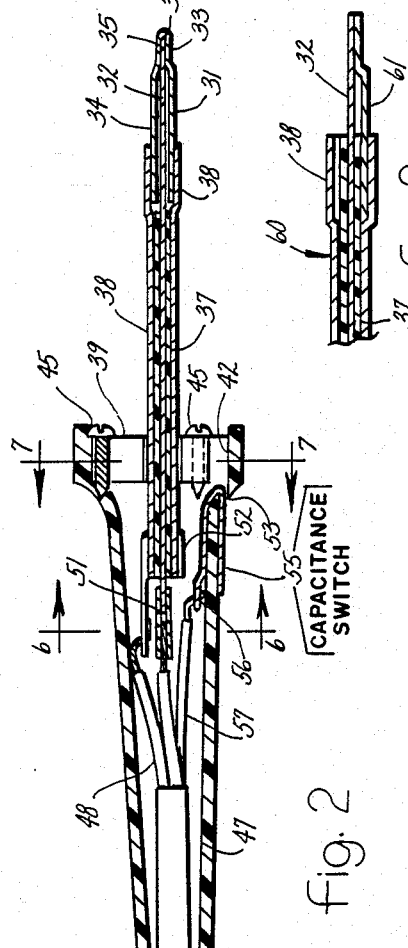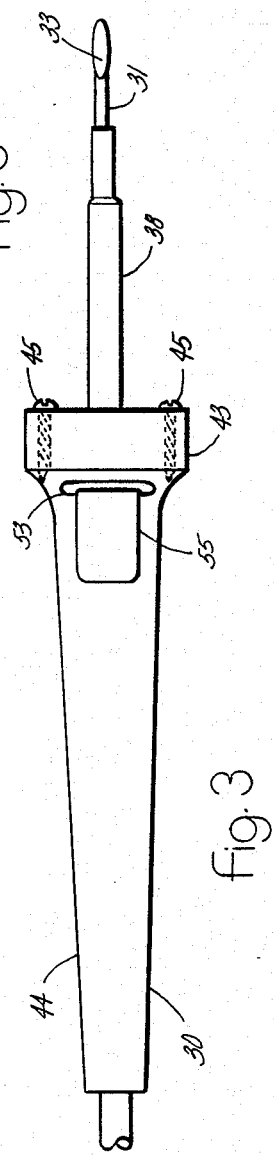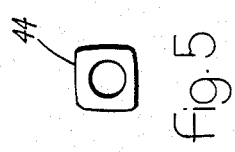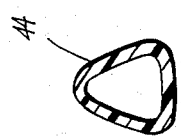

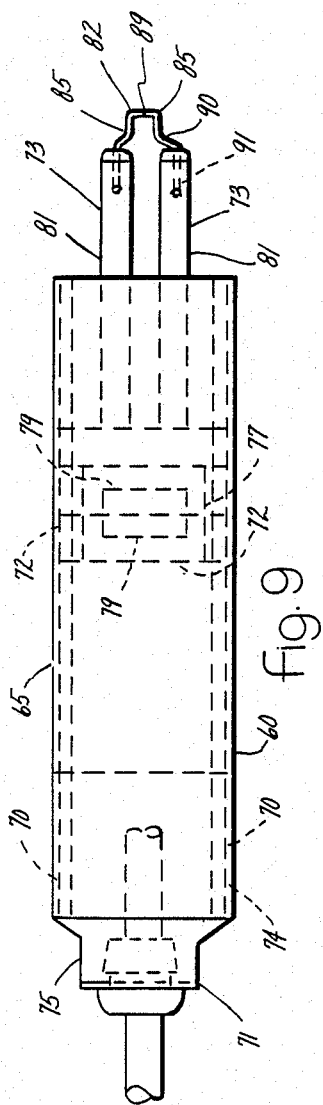

TEMPERATURE CONTROLLED SOLDERING IRON WITH A UNITARY ELECTRICALLY HEATED SOLDERING TIP AND THERMOCOUPLE

BACKGROUND AND SUMMARY OF THE INVENTION

This invention relates to temperature controlled soldering irons and more particularly to an electric soldering iron with improved means for controlling the temperature of the iron.

The well known construction of temperature controlled soldering irons is exemplified by Finch U.S. Pats. Nos. 2,897,335 and 3,699,306 and has a relatively massive iron tip, a heating element and a thermocouple. The thermocouple is attached to the iron tip at a point which is remote from where soldering is performed. The heating element and ends of the wire which connect the element and thermocouple to an external power supply and control circuit are housed in a tubular metal shank which is attached to the iron tip. A wooden or plastic handle is attached to the opposite end portion of the tubular shank.

One deficiency with this construction, that the present invention addresses, is that the temperature of the tip at the point where soldering is performed cannot be instantaneously controlled because of a time lag caused by the separation of the attachment of the thermocouple which senses temperature from the point of soldering.

Another deficiency is the slow warm-up of the tip because of the mass of the soldering tip and heating element. A result of the slow warm-up is that when soldering is not in process, the iron is generally maintained in a heated stand-by condition to avoid delays when soldering is to be done. This is both wasteful of electrical energy and detracts from the utility of battery operated models, because of the current drain on batteries.

Another deficiency with this construction is an undesirably high handle temperature because the iron is maintained in a heated condition and the method of attachment of the handle to the tubular shank.

It is further noteworthy that the new technology of surface mounting components to printed circuit boards and reductions in size and power rating of electronic components has increased the need for an improved temperature controlled soldering iron.

One important feature of the present invention is that a single pair of dissimilar conductors provides a soldering tip, a heating element and a means for directly sensing temperature at the point of soldering of the tip. Thus, complexity is reduced and the separation of the thermocouple attachment from the point of soldering is eliminated. It is needless to say reliability will be improved because of the reduced complexity. Moreover, the present invention provides the further benefits of reductions in size, weight, cost, and warm-up time of temperature controlled soldering irons.

Since the invention substantially reduces warm-up time, it follows that irons which embody the invention may be switched on and off, on an "as-needed" basis without loss of utility. Also, as will be appreciated, the reduced size and weight facilitates the handling and soldering small electronic components.

Another feature of the invention, which in itself is believed novel, is the unique means of attaching the handle which provides the benefit of reduced handle temperature.

The pair of conductors which provide a soldering tip, heating element and temperature sensor are made of dissimilar metals, of the type commonly used for making thermocouples, such as Nichrome and Constantan. One end portion of the connectors are joined together to form a soldering tip and except for the union at the soldering tip, the conductors are separated in a side-by-side arrangement. The other end portions of the conductors are connected to an external A.C. power supply and electronic control circuit.

The dissimilar conductors are mounted in a tubular shank which is attached to a handle by a spider-shaped bracket which reduces heat transfer from the shank to the handle.

The conductors are in series with one another and the secondary winding of a transformer which provides A.C. current for heating the conductors. Transformer current is regulated by a triac in the external control circuit. An "on-off" switch is provided to operate the soldering iron on an "as-needed" basis.

When an A.C. current from the transformer flows through the conductors, the temperature of the conductors is raised and a D.C. voltage is generated by the conductors which is directly proportional to the temperature of the conductors. Since the conductors serve as the soldering tip, the D.C. voltage provides a signal for instantaneously sensing the temperature of the tip. The D.C. voltage is applied to the control circuit where it is amplified and compared against a reference voltage which is pre-selected, by a user, in accordance with a desired soldering temperature. The difference between the D.C. signal and reference voltage is applied to a triac which controls the current supplied by the transformer to the series connected dissimilar conductors.

Further features of the invention along with additional benefits and objects will become apparent by reference to the drawings and ensuing detailed description of the preferred embodiment of the invention which discloses the best mode contemplated in carrying out the invention. The subject matter in which exclusive rights is claimed is set forth in the numbered claims following the detailed description of the invention.

BRIEF DESCRIPTION OF THE DRAWINGS

FIG. 1 is a plan view of a temperature controlled soldering iron constructed in accordance with the invention.

FIG. 2 is a longitudinal sectional view taken on the line 2—2 of FIG. 4 showing the internal construction of the soldering iron.

FIG. 3 is a right side view of the soldering iron.

FIG. 4 is a right end view of the soldering iron.

FIG. 5 is a left end view of the soldering iron with the power cord omitted.

FIG. 6 is a sectional view taken on the line 6—6 of FIG. 2 with the internal parts omitted.

FIG. 7 is a sectional view taken on the line 7—7 of FIG. 4.

FIG. 8 is a partial sectional view of an alternate embodiment of the invention.

FIG. 9 is a plan view of another alternate embodiment.

FIG. 10 is a side view of the embodiment of FIG. 9.

FIG. 11 is a sectional view taken on the line 11—11 of FIG. 10.

FIG. 12 is a sectional view taken on the line 12—12 of FIG. 10.

DESCRIPTION OF THE PREFERRED EMBODIMENT

Figure 14:
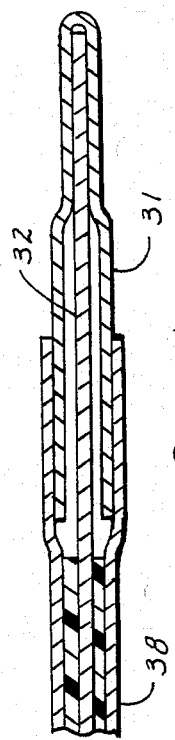
FIG. 14 is an enlarged partial view of FIG. 2, showing the iron tip of the soldering iron.

Referring now to the drawings wherein like numerals designate like and corresponding parts throughout the several views, in the temperature controlled soldering iron 30 illustrated therein there is provided a common pair of conductors 31, 32 which serve as a soldering tip, a heating element and a thermocouple for generating a D.C. voltage signal to control the temperature of the tip. The conductors are preferably made from combinations of materials commonly used for thermocouples, such as, Nichrome and Constantan and except for one of the end portions of the conductors 31, 32 which are joined together to form the soldering tip, they are spaced apart from each other in a side-by-side arrangement. Before or after joining, the end portions 33 are tapered as shown in FIG. 2 or as will be later seen formed into a variety of other shapes.

In the particular embodiment 30 illustrated in FIGS. 1 through 7 and 14, inclusive, one of the conductors 31 is folded into a modified U-shape. The other conductor 32, being straight, is disposed between the sides 34 of the folded conductor 31 with one end portion 35 tightly nested and preferably welded in the root 36 of the fold. Adjacent to the root 36 of the fold, the sides 34 of the folded conductor 31 are offset outwardly to space them apart from the straight conductor 32 which is centrally disposed between the sides 34 of the folded conductor 31.

As shown in FIG. 2, the straight conductor 32 is insulated with a suitable dielectric material 37, such as glass cloth, and tightly mounted in a thin metal tubular shank 38 by crimping an end portion of the shank 38 around the conductors 31, 32. The folded conductor 31 is preferably welded to the tubular shank 38 to provide a good electrical connection between the folded conductor 31 and shank 38.

At one end portion of the tubular shank 38, a short metal bracket 39 is fixed to the outer surface of the shank 38 by welding or some other suitable means. The bracket 39 is formed from a strip of thin metal or short length of thin tubing into three adjoining equally spaced folded spoke portions 41. The dissimilar conductors 31, 32, tubular shank 38 and bracket 39 comprise an assembly which can be conveniently replaced during service of the iron 30 or the installation of alternate soldering tips.

The bracket 39 is positioned in a circular recess 42 of the enlarged end portion 43 of a generally cylindrical handle 44 and is retained in the recess 42 by three small screws 45 which closely fit the arcuate end portions 46 of the three folded spokes 41 and threadably engage the handle 44. The circular recess 42 is a portion of the hollow interior 47 of the handle 44 through which the wires 48 to an external power supply (not shown) and control circuit (not shown) are routed.

The end portion 51 of the straight conductor 32, at the interior 47 of the handle 44, projects outwardly from the tubular shank 38 and with the inner end portion 52 of the shank 38 connects to the wires 48 of the external power supply (not shown) and control circuit (not shown) by soldering or other suitable means.

With reference to FIGS. 2 and 3, where the enlarged end 43 of the handle 44 joins the remaining portion of the handle, there is provided three radial ventilation slots 53 for cooling the handle 44. One slot 53 receives a U-shaped folded conductor 55 made from a thin flat strip of metal. The folded conductor 55 is a capacitance type switch for operating the soldering iron 30 on an "as-needed" basis. The end portion 56 of the capacitance switch 55 at the interior 47 of the handle 44 is joined to a wire 57 of the control circuit 50 by soldering or other suitable means. It will be appreciated other types of conventional switches may be used in place of the capacitance switch.

Referring now to FIG. 7, the small area of contact of the tubular shank bracket 39 and handle 44 reduces handle temperatures by reducing conductive heat transfer from the tubular shank 38 to the handle 44. Handle temperatures may be further reduced by using bright finishes on the bracket and tubular sleeve to minimize radiation heat transfer to the handle 44.

Referring now to FIG. 8, another embodiment 60 is illustrated therein which in all respects is similar to the above embodiment 30 except for the use of a modified straight conductor 61 in place of the folded conductor 31. The conductor 61 is offset to space it apart from the other conductor 32.

In FIGS. 9 through 12, inclusive, an embodiment 65 of the invention is illustrated which is particularly adapted to surface mounting electronic components on printed circuit boards. In the embodiment 65 shown therein, a pair of generally rectangular arms 66 are pivotally joined together at one end portion and resiliently biased in a normally open position. The arms 66 may be identical, except for a slotted aperture (not shown) in one of the arms 66 if a switch 55 of the type previously described is used.

In each arm 66 is a pair of grooves 70 into which a U-shaped leaf spring 71, a hat-shaped bracket 72 and soldering tip assembly 73 are press fitted. The leaf spring 71 has spaced apart straight portions 74, interconnected by a center loop portion 75 for pivotally joining the arms 66 and resiliently biasing them in the open position shown in FIG. 10. The side edge portions 74 of the leaf spring 71 engage the grooves 70 of the arms 66.

The hat-shaped brackets 72 are identical and each has short horizontal outer portions 76 which are press fitted into the grooves 70 of the arms 66, a pair of vertical straight portions 77 which adjoin the outer horizontal portions 76 and a horizontal straight center portion 78 which interconnects the vertical portions 77. In the center portion 78 of each bracket 72 there is a tab 79 which, in assembly, overlaps a similar tab 79 of the other bracket 72 for establishing the open position of the arms 66 and position the arms parallel to each other.

The soldering tip assemblies 73 are identical and comprise a generally rectangular flat insulator 80 which is press fitted into grooves 70 of corresponding arms 66, a pair of identical slender rectangular tip holders 81 attached by screws 91 or other suitable means to the center portion of the flat insulator 80, a U-shaped soldering tip 82, detachably mounted to the end portions of the rectangular holders 81, and a pair of screws 83 for detachably retaining the tip 82 in the holders 81. The soldering tip 82 is made of dissimilar wire conductors 84, 85 joined together by butt welding or other suitable means.

With reference to FIG. 10, in each of the tip holders 81 is a transverse aperture 86 which receives an end portion 87 of the soldering tip 82. At right angles to the transverse aperture there is an intersecting threaded aperture 88 which receives a screw 83 that retains the end portion 87 of the tip 82.

The shape of the tip 82 is best seen in FIG. 9. The generally U-shaped tip 82 consists of two symmetrically opposite members 84, 85 joined together by welding or other suitable means and comprises a center portion 89, side portions 90 and relatively short outer portions 91 which extend outwardly from the ends of the side portions 90. The side portions 90 are offset such that a relatively narrow center portion 89 is provided for access to small and confined areas of a workpiece (not shown).

Figure 13:
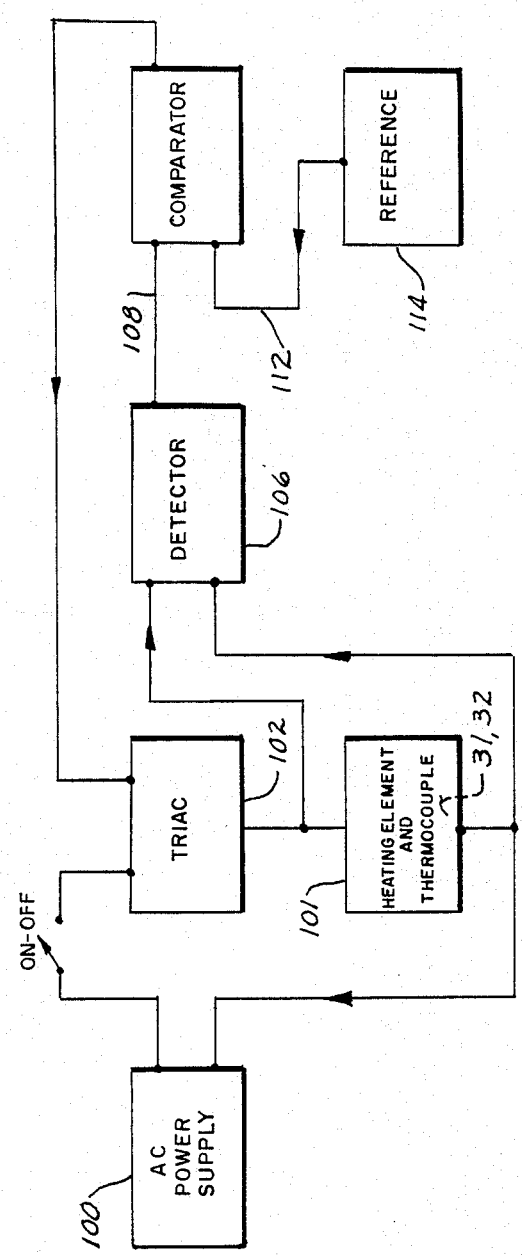
FIG. 13 is a schematic diagram of a power supply and control circuit.

FIG. 13 is a block diagram of the electrical circuit used with the soldering iron 30. It will be appreciated that since other circuits may be used for accomplishing the same ends, that the block diagram shown in FIG. 13 is not intended by way of limitation.

The circuit receives conventional A.C. power (115 v, 60 hz) and this power is preferably reduced in magnitude of voltage by a transformer which is included in the block 100 which designates the power supply.

The reduced magnitude voltage is delivered across the series combination of a triac 102 and the conductors 31, 32 which comprise the tip. When current at the reduced voltage is supplied to the conductors 31, 32, a temperature difference develops between the junction and opposite end portions of the dissimilar conductors 31, 32. These temperature effects are in addition to the normal heating of the conductors. Thus, the dissimilar conductors 31, 32 form a thermocouple 101 and a small voltage is developed across the ends of the conductors 31, 32 which varies directly with the temperature of the hot junction.

The triac 102 is an A.C. solid state switch which controls the current flow to the tip by selectively controlled conduction. Hence, the switch 102 serves to control the power flow into the tip and therefore controls the tip temperature.

A sensing circuit is associated with the tip and is illustrated as comprising conductors 31, 32 connecting to the two sides of the tip. This forms the input signal to the sensing circuit, specifically to a detector 106.

The detector 106 develops at its output a signal which is correlated with the temperature at the tip. This output signal appears at the line 108 which supplies the signal as one input to a comparator 110. Comparator 110 has a second input 112 which is connected to receive a reference signal from a reference source 114. The reference source is preferably a selectable voltage derived from a potentiometer and corresponds to a pre-selected soldering tip temperature.

Comparator 110 amplifies and compares the signal from detector 106 with the reference signal from reference source 114. The comparator output signal corresponds to the difference between the two signals. This output signal in turn controls the triac 102, and there is included a conventional triac firing circuit to cause the triac 102 to be fired in accordance with the level of the comparator 110 output signal.

The sensing circuit operates to control the power input to the tip in a manner such that the power input is caused to correspond to the setting of the reference 114.

Hence, by adjusting the reference 114 to a desired setting, a desired tip temperature is achieved with the sensing circuit regulating the temperature closely to that which has been set. This is like a closed loop control of the tip temperature, but with the tip itself forming the thermocouple.

From the foregoing it is apparent that the present invention provides improvements in temperature controlled soldering irons which heretofore have not been available.

Although but several embodiments of the invention have been illustrated and described herein, it will be appreciated that other embodiments can be derived by changes in the material, size, shape, and arrangement of parts without departing from the spirit thereof.

I claim:

1. In a temperature controlled soldering iron of the type having a soldering tip heated by an electric heating element and wherein a thermocouple is used for sensing and controlling the temperature of the soldering tip, the improvement which comprises:

at least one common pair of conductors made from dissimilar metals joined together to unitarily provide said soldering tip, the electric heating element for heating said tip and said thermocouple for sensing the temperature of the tip, the end portion of one conductor being joined to a portion of the other conductor to provide said soldering tip and the other end portion of said one conductor and an end portion of the other conductor being operatively connected to a power supply such that when current is supplied to the conductors, the soldering tip is electrically heated and a voltage is generated by said joined portions indicative of the temperature of said tip;

a handle for supporting said pair of dissimilar conductors;

means for mounting the pair of dissimilar conductors to said handle with said soldering tip extending outwardly from an end thereof;

said power supply operatively connected to the dissimilar conductors supplying current to said conductors to heat said soldering tip to generate said voltage for sensing the temperature of said tip; and an electronic temperature control circuit operatively connected to said pair of dissimilar conductors and including means for regulating the temperature of said tip in response to said generated voltage.

2. The improvement in a temperature controlled soldering iron recited in claim 1 wherein said electronic control circuit comprises:

means for amplifying the voltage generated by the heating of the dissimilar conductors to sense the temperature of the soldering tip;

means for generating a reference voltage, corresponding to a pre-selected temperature of the soldering tip;

means for comparing said amplified temperature sensing voltage with the reference voltage; and means responsive to said voltage comparison means for regulating the heating current supplied to said conductors.

3. The improvement in a temperature controlled soldering iron recited in claim 1 wherein one end portion of one of said dissimilar conductors is connected to one end portion of the other dissimilar conductor for providing said soldering tip and the other end portions of the conductors are operatively connected to said power supply and control circuit.

4. The improvement in a temperature controlled soldering iron recited in claim 1 wherein the other of said conductors is folded, an end portion of the one conductor is disposed between the sides of the folded conductor and tightly nested in and electrically connected to the root of the fold of the other conductor, and the other end portions of the conductors are operatively connected to said power supply and control circuit.

5. The improvement in a temperature controlled soldering iron recited in claim 1 wherein said power supply is an A.C. power supply.

6. The improvement in a temperature controlled soldering iron recited in claim 1 wherein one of said conductors is made from Nichrome and the other conductor is made from Constantan.

7. The improvement in a temperature controlled soldering iron recited in claim 1 wherein said control circuit further comprises an on-off switch for the soldering iron.

8. The improvement in a temperature controlled soldering iron recited in claim 1 wherein said handle comprises:

said handle being generally cylindrical and having an aperture extending axially through said handle for receiving the dissimilar conductors; and detachable means at one end portion of said handle for retaining the dissimilar conductors to said handle.

9. The improvement in a temperature controlled soldering iron recited in claim 8 further comprising:

a layer of electrically insulative material tightly surrounding a portion of one of said dissimilar conductors, said end portion of said one conductor which joins the other conductor projects outwardly from said insulative material;

a tubular shank tightly surrounding said layer of insulative material said tubular shank being of a length such that the end portions of the dissimilar conductors which are opposite the soldering tip extend outwardly from the tubular shank for attachment to said control circuit.

10. The improvement in a temperature controlled soldering iron recited in claim 9 further comprising a bracket fixedly attached to the outer surface of the tubular shank for spacing said shank away from the interior surface of said handle to reduce the heat transfer from the heated conductors to said handle, said bracket being of a length which is substantially less than the length of the tubular shank and having an arcuate center portion conforming to the outer diameter of the tubular shank and outwardly extending radial loop portions for mounting and spacing said shank away from said handle.

11. The improvement in a temperature controlled soldering iron recited in claim 10 wherein said dissimilar conductors, said tubular shank and said bracket comprise an assembly which is replaceably mounted to said handle for servicing said soldering iron or installing alternate soldering tips.

12. The improvement in a temperature controlled soldering iron recited in claim 1 wherein said pair of dissimilar conductors are made from dissimilar metal wires.

13. The improvement in a temperature controlled soldering iron recited in claim 12 wherein said wires are substantially coplanar in a spaced apart side-by-side arrangement.

14. The improvement in a temperature controlled soldering iron recited in claim 13 wherein the end portions of the dissimilar metal wires which are joined together to form the soldering tip are disposed parallel to the remaining portions of said wires.

15. A temperature controlled electric soldering iron comprising: an electrical power supply; at least one pair of conductors made from dissimilar metals, an end portion of one conductor being joined to a portion of the other conductor to unitarily provide a soldering tip, an electric heating element for heating said tip and a thermocouple for sensing the temperature of the tip, the other end portions of said pair of conductors being operatively connected to said power supply such that when current is supplied to the conductors, the soldering tip is electrically heated and a voltage is generated by said joined end portions indicative of the temperature of said tip; and an electronic temperature control circuit operatively connected to said pair of dissimilar conductors and including means for regulating the temperature of said tip in response to said generated voltage.

* * * * *